United States Patent
Boutet et al.

(10) Patent No.: US 11,167,170 B2
(45) Date of Patent: Nov. 9, 2021

(54) METHOD FOR AUTOMATIC RECOGNITION OF A PREDETERMINED MOVE OF A USER

(71) Applicant: Commissariat A L'Energie Atomique et aux Energies Alternatives, Paris (FR)

(72) Inventors: Jerome Boutet, Grenoble (FR); Prince Arnaud Ramahefa-Andry, Grenoble (FR)

(73) Assignee: Commissariat A L'Energie Atomique et aux Energies Alternatives, Paris (FR)

(*) Notice: Subject to any disclaimer, the term of this patent is extended or adjusted under 35 U.S.C. 154(b) by 286 days.

(21) Appl. No.: 16/413,837

(22) Filed: May 16, 2019

(65) Prior Publication Data

US 2019/0351286 A1 Nov. 21, 2019

(30) Foreign Application Priority Data

May 17, 2018 (FR) .................................. 18 54115

(51) Int. Cl.
    *A63B 24/00* (2006.01)
    *G09B 19/00* (2006.01)
    *A63F 13/816* (2014.01)

(52) U.S. Cl.
    CPC ...... *A63B 24/0006* (2013.01); *G09B 19/0038* (2013.01); *A63B 2220/40* (2013.01);
(Continued)

(58) Field of Classification Search
    CPC . A63B 24/0006; A63B 24/0003; A63B 24/00; A63B 2220/40; A63B 2220/36;
(Continued)

(56) References Cited

U.S. PATENT DOCUMENTS

| 2008/0064498 A1* | 3/2008 | Okamura | A63F 13/00 463/34 |
| 2010/0144414 A1* | 6/2010 | Edis | G16H 20/30 463/8 |

(Continued)

FOREIGN PATENT DOCUMENTS

FR      3 072 579 A1      4/2019

OTHER PUBLICATIONS

French Preliminary Search Report dated Feb. 25, 2019 in French Application 18 54115, filed on May 17, 2018 (with English Translation of Categories of Cited Documents & Written Opinion).

*Primary Examiner* — Mohamed Charioui (74) *Attorney, Agent, or Firm* — Oblon, McClelland, Maier & Neustadt, L.L.P.

(57) ABSTRACT

A method for automatic recognition of a predetermined move of a user includes the construction of several characteristic physical quantities of the move of the user from acquired measurements performed by a tri-axial accelerometer only within a time interval $[t_d; t_i]$, where the instant $t_i$ is an instant, later than the instant $t_d$, at which the measured acceleration of a fist of the user in a direction $X_m$ changes sign and becomes negative, the direction $X_m$ being the direction parallel to a forearm of the user, directed from the elbow of the user to the fist of the user, then the classification of the move of the user in a predefined move category, chosen from among several possible predefined categories of moves, from these constructed characteristic physical quantities.

12 Claims, 3 Drawing Sheets

(52) U.S. Cl.
CPC ... *A63B 2220/803* (2013.01); *A63B 2244/102* (2013.01); *A63F 13/816* (2014.09)

(58) Field of Classification Search
CPC .......... A63B 2220/34; A63B 2220/803; A63B 2244/102; G09B 19/0038; G09B 19/003; G09B 19/00; G06K 9/00355; G06K 9/00342; G06K 9/00335
See application file for complete search history.

(56) References Cited

U.S. PATENT DOCUMENTS

| | | |
|---|---|---|
| 2011/0151974 A1 | 6/2011 | Deaguero |
| 2014/0372440 A1 | 12/2014 | Cains |
| 2015/0360080 A1* | 12/2015 | Hadaschik ............... G01P 15/18 73/865.4 |
| 2016/0091965 A1* | 3/2016 | Wang .................... G06F 3/0346 345/156 |
| 2016/0263458 A1* | 9/2016 | Mather ................ G06K 9/0055 |

* cited by examiner

METHOD FOR AUTOMATIC RECOGNITION OF A PREDETERMINED MOVE OF A USER

BACKGROUND

The invention relates to a method and a device for automatic recognition of a predetermined move of a user, and an information storage medium for implementing this method.

Known methods for automatic recognition of a predetermined move of a user comprise the following steps:

a) the acquisition, at a predetermined sampling frequency, of the measurements of a tri-axial accelerometer and of a tri-axial gyrometer each fixed onto a forearm of the user,
b) the construction of several characteristic physical quantities of the move of the user from the measurements acquired from the accelerometer and from the gyrometer which have been performed from an instant $t_d$ of the beginning of the move of the user and without taking into account the measurements acquired from the accelerometer and from the gyrometer performed before this instant $t_d$, then
c) the classification of the move of the user in a predefined move category, chosen from among several possible predefined categories of moves, on the basis of these constructed characteristic physical quantities.

For example, such a known method is disclosed in the document US20160263458.

These known methods comprise a step of determination of a time interval $[t_d; t_f]$ during which a move to be recognized is performed by a boxer. Then, only the measurements performed within this time interval $[t_d; t_f]$ are exploited to recognize the move of the boxer. For example, these measurements are processed by a classifier which associates these measurements with a predefined boxing move category. Once this association is made, the boxing move is called "recognized".

The instant $t_f$ corresponds to the instant at which an impact on a target is detected. For example, the document US20160263458 teaches that this instant $t_f$ can be determined by comparing the norm of the measured instantaneous acceleration to a predetermined threshold. In effect, the impact of the fist of the boxer on a target is reflected by an abrupt deceleration of the fist which marks the end of the move of the boxer.

Another document US20140372440 teaches that this instant $t_f$ can also be determined using a pressure sensor which detects the impact of the fist on a target.

Once the instant $t_f$ is determined, the instant $t_d$ is conventionally determined by subtracting from the instant $t_f$ a predetermined time which corresponds approximately to the conventional time of a move to be recognized. Thus, in the known methods, the classifier processes in particular the measurements performed by the accelerometer and the gyrometer just before, and often during, the impact on a target.

SUMMARY

The invention aims to propose a method for automatic recognition of a predetermined move of a user that is more reliable.

Its subject is therefore such a method in accordance with claim 1.

The embodiments of this method can comprise one or more of the features of the dependent claims.

Another subject of the invention is a microprocessor-readable information storage medium comprising instructions for the execution of the method that is the subject of the invention when these instructions are executed by the microprocessor.

Another subject of the invention is a device for automatic recognition of a predetermined move of a user for the implementation of the claimed method.

BRIEF DESCRIPTION OF THE DRAWINGS

The invention will be better understood on reading the following description, given purely as a nonlimiting example, and with reference to the drawings in which.

In these figures, the same numeric references denote the same elements.

DETAILED DESCRIPTION

Chapter I: Examples of Embodiments

Figure 1:
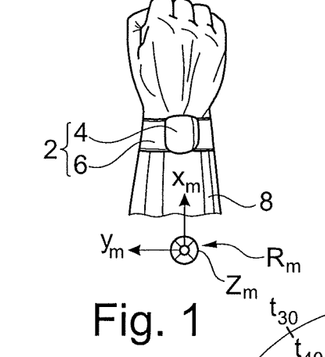
FIG. 1 is a schematic illustration of the forearm of a boxer equipped with a device for automatic recognition of a move of a boxer.

FIG. 1 represents a device 2 for automatic recognition of a move of a boxer. The device 2 comprises:

a housing 4 inside which are housed all of the electronic components necessary for automatically recognizing a move of the boxer, and means 6 for fixing this housing 4 on a forearm 8 of a boxer. The housing 4 is for example rigid.

Here, the forearm 8 is, for example, the right forearm of the boxer.

FIG. 1 also represents a direct reference frame $R_m$ that is fixed with no degree of freedom to the forearm 8 and more specifically to the device 2. This mobile reference frame $R_m$ comprises three axes that are respectively parallel to three mutually orthogonal directions $X_m$, $Y_m$ and $Z_m$. The direction $X_m$ extends in the longitudinal direction of the forearm 8 from the elbow of the boxer to the fist of the boxer.

Figure 2:
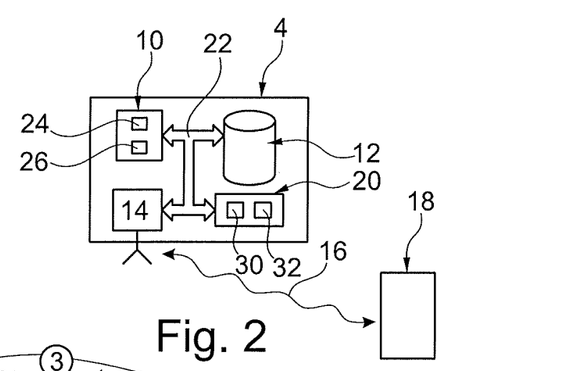
FIG. 2 is a schematic illustration of the architecture of the device of FIG. 1.
Figure 5:
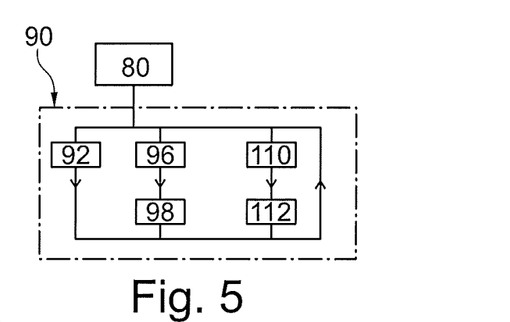
FIGS. 5 and 6 are flow diagrams of methods for automatic recognition of a move of the boxer that can be implemented by the device of FIG. 1.
Figure 6:
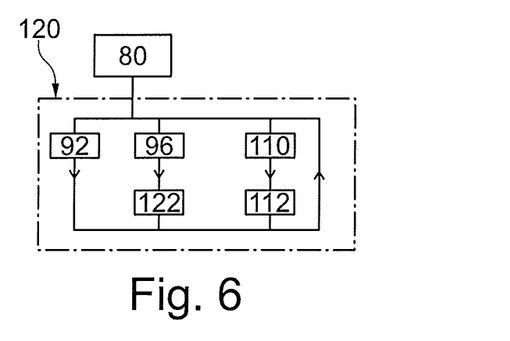

FIG. 2 represents in more detail the components of the housing 4. The housing 4 comprises:

a programmable microprocessor 10 capable of executing instructions stored in a memory, a memory 12 in which are stored the instructions and the data necessary for the execution of the method of FIG. 5 or 6, a transceiver 14 capable of establishing a wireless information transmission link 16 with a remote server 18, an inertial unit 20 also known by the acronym IMU (Inertial Measurement Unit), and an information transmission bus 22 allowing the various components of the housing 4 to exchange information with one another.

The inertial unit 20 comprises in particular a tri-axial accelerometer 30 and a tri-axial gyrometer 32.

The microprocessor 10 implements in particular:

a module 24 for confirming the moves to be recognized, and a classifier 26 capable of classifying the moves to be recognized in a predefined category of moves.

The module 24 and the classifier 26 can be implemented in hardware or software form. Here, for example, they are implemented in software form.

The accelerometer 30 measures the acceleration of the housing 4, and therefore of the forearm 8, along three distinct measurement axes. Preferably, the three measurement axes of the accelerometer 30 are respectively parallel to the directions $X_m$, $Y_m$ and $Z_m$.

The gyrometer 32 measures the angular speed of the housing 4, and therefore of the forearm 8, about three distinct axes. Preferably, the three measurement axes of the gyrometer 32 are respectively parallel to the directions $X_m$, $Y_m$ and $Z_m$.

Figure 3:
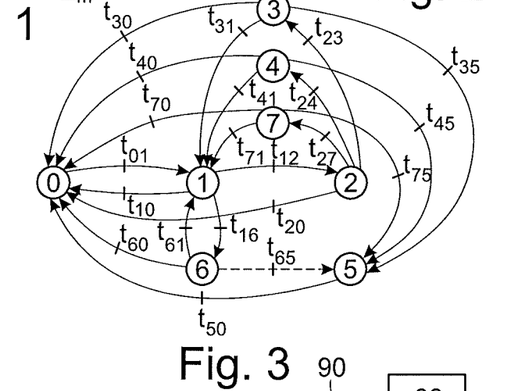
FIG. 3 is a schematic illustration of a state machine implemented by the device of FIG. 1.

The module 24 is, here, implemented in the form of a state machine. The different states of this machine and the transitions between these states are represented in FIG. 3. In this FIG. 3, the various possible states are represented by circles containing the number of the corresponding state. Thus, for example, the state "0" is represented by a circle containing the digit 0. The transitions $t_{ij}$ between states are represented by oriented arrows. The direction of the arrow indicates the order in which it is possible to go from a preceding state to the next state. The indices "i" and "j" of the transition $t_{ij}$ denote, respectively, the preceding state "i" and the next state "j" of this transition. Each of these transitions is associated with a condition represented by a bar which cuts this transition. The module 24 switches from a preceding state to a next state only when the condition associated with the transition which links these two states is satisfied.

The module 24 is designed to confirm that the actual move of the boxer is indeed a move to be recognized. The actual move is the one that the boxer is in the process of executing. Thus, the module 24 eliminates the stray moves, that is to say moves of the boxer which modify the measurements of the accelerometer 30 or of the gyrometer 32 but which are not moves to be recognized. Here, the moves of the boxer that are sought to be recognized are blows delivered by fists on a physical target or in empty space whereas the stray moves correspond for example to moves due to the skipping around of the boxer.

Figures 7, 8, 10, 11:
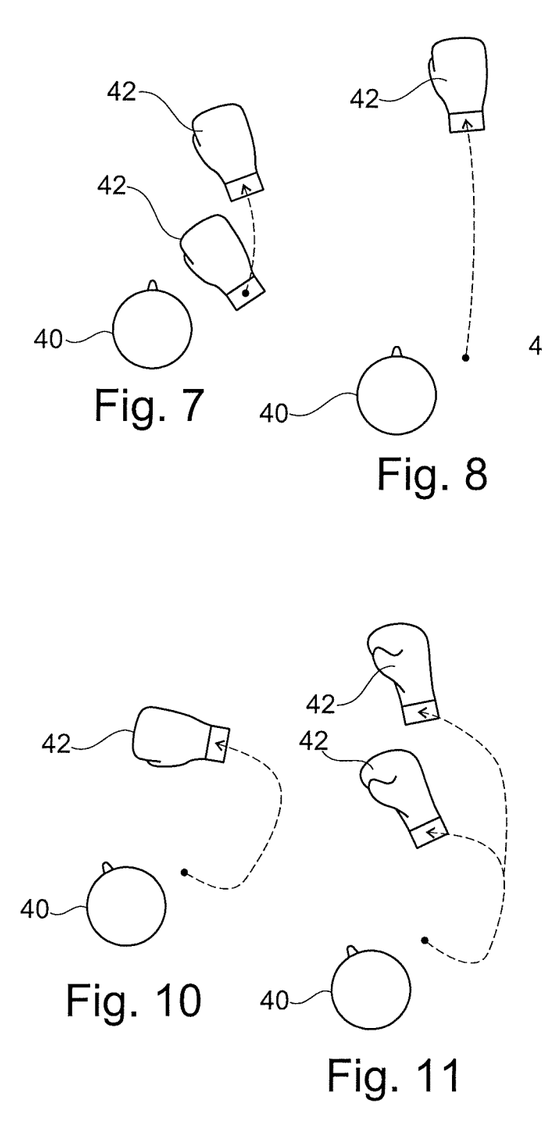
FIGS. 7 to 17 are schematic illustrations of different moves of the boxer that can be processed by the device of FIG. 1.
Figure 9:
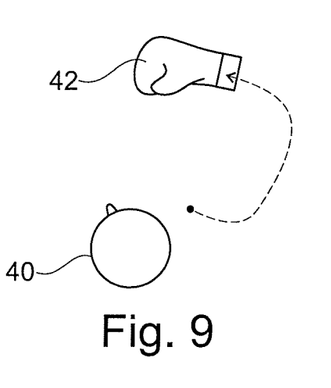
Figure 12:
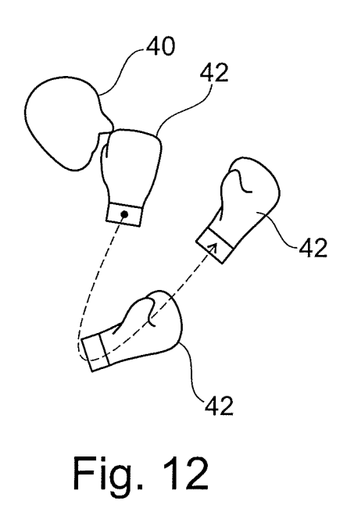
Figure 13:
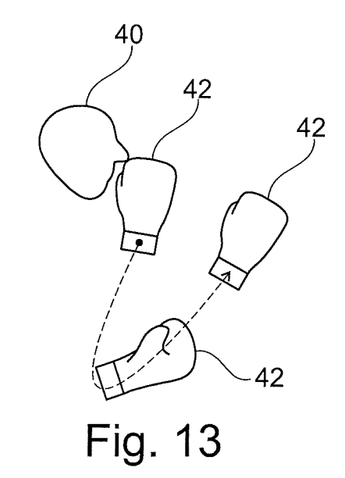
Figure 14:
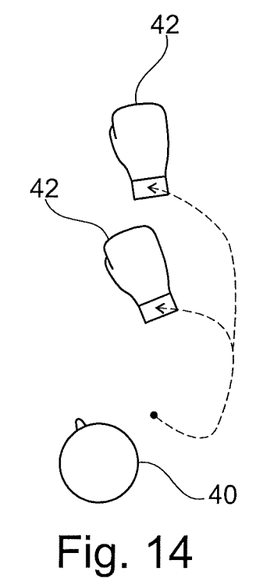

As an illustration, FIGS. 7 to 17 represent different moves that the boxer can perform. In these figures, the circle with an appendage represents the head 40 of the boxer. In FIGS. 7 to 11 and 14 and 15, the head and the move of the boxer are seen from above. In FIGS. 12, 13, 16 and 17, the head 40 and the move of the boxer are represented in profile. In these figures, the reference 42 denotes a boxing glove housing the fist of the boxer. In these figures, a dotted line arrow represents the trajectory of the glove 42 from the start of the move of the boxer to the end of this move. The black dot represents the start of the trajectory of the move of the boxer. Several gloves 42 are represented in FIGS. 7, 12, 13 and 16. In these four figures, each glove 42 illustrates a position of the same glove at a particular location of the trajectory in the performance of the move of the boxer. FIGS. 11 and 14 each represent two moves of the boxer and each glove 42 represents the end of each of these moves.

Figure 15:
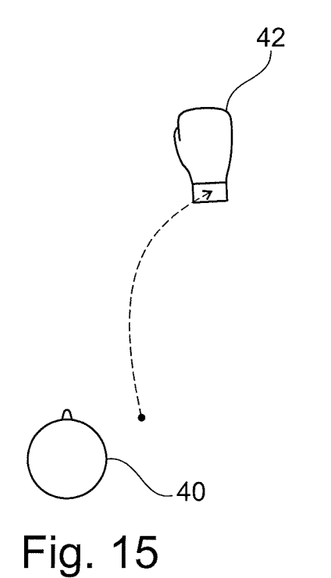
Figure 16:
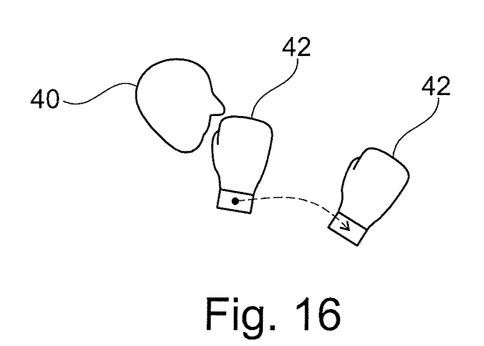
Figure 17:
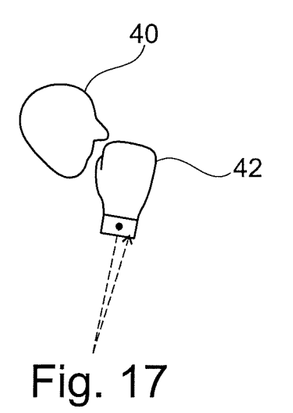

FIGS. 7 to 14 correspond to moves of the boxer that it may be interesting to recognize. FIGS. 15 to 17 illustrate, on the other hand, stray moves of the boxer. More specifically, FIGS. 7 to 14 represent, respectively:

a short straight punch, a long straight punch, a hook with thumb uppermost, a hook with thumb toward the boxer, a hook known as "swing", reflected by a contact with the inside of the glove (FIG. 11 represents a short swing and a long swing), an uppercut with the thumb toward the outside, an uppercut with the thumb toward the boxer, a short hook and a long hook ending with a contact with the thumb.

FIGS. 15 to 17 represent the stray moves, which correspond respectively to:

a simple extension of the arm of the boxer, a back and forth of the fist of the boxer over a circular arc, and a back and forth of the fist of the boxer in a direction corresponding, for example, to a skip of the boxer.

Examples of additional stray moves that the module 24 must eliminate can also include:

a blow delivered to the boxer by another boxer, a blow delivered by the boxer on a target with the fist on the other forearm, not the forearm 8.

The module 24 is designed to confirm whether the current move of the boxer is or is not a move to be recognized. The classifier 26 is executed only if the module 24 has previously confirmed that the current move is a move to be recognized.

The module 24 is, here, also designed to construct, while it proceeds with the confirmation of the move of the boxer, characteristic physical quantities of the move of the boxer. These characteristic physical quantities are intended to be processed by the classifier 26 to recognize this move. For that, the module 24 constructs these characteristic physical quantities only from the measurements performed within a time interval $[t_d; t_i]$. The instant $t_d$ corresponds to the instant of the start of the move of the boxer. The instant $t_i$ is an instant, later than the instant $t_d$, at which the acceleration measured in the direction $X_m$ by the accelerometer 30 changes sign and becomes, for example, negative. The instant $t_i$ is prior to the abrupt deceleration which marks the end of the move of the boxer. For example, the instant $t_i$ is the last instant, later than the instant $t_d$, at which the acceleration changes sign to become negative before this abrupt deceleration. By convention, here, the acceleration is positive along a measurement axis when the forearm 8 accelerates in the direction of the direction $X_m$ represented in FIG. 1. In the contrary case, the acceleration is negative. Likewise, by convention, the angular speed measured by the gyrometer 32 about an axis is positive when the rotational movement of the forearm 8 about this axis occurs in the retrogade or indirect direction and becomes negative when the forearm 8 moves rotationally in a direct direction. With these sign conventions, the acceleration in the direction $X_m$ is positive just before the instant $t_i$ and becomes negative just after the instant $t_i$. Obviously, the conventions can be modified in such a way that the acceleration becomes positive upon a deceleration and the angular speed becomes negative upon a rotation in the indirect direction.

FIG. 3 represents an exemplary embodiment of a state machine implemented in the module 24 and which makes it possible to fulfil the different functions described above. The different states and different conditions associated with the transitions $t_{ij}$ of this state machine are now described in more detail.

Hereinbelow, $t_c$ denotes the most recent instant at which the microprocessor 10 has acquired new measurements from the inertial unit 20. The new measurements from this inertial unit 20 are acquired at a sampling frequency $f_e$. Thus, the instants $t_c$ are repeated periodically at the frequency $f_e$. The new measurements of the accelerometer 30 in the directions $X_m$, $Y_m$ and $Z_m$ acquired at the instant $t_c$ are denoted, respectively, $A_{tcXm}$, $A_{tcYm}$ and $A_{tcZm}$. The new measurements of the gyrometer 32 in the directions $X_m$, $Y_m$ and $Z_m$ acquired at the instant $t_c$ are denoted $G_{tcXm}$, $G_{tcYm}$ and $G_{tcZm}$.

In each state of the state machine, the module 24 waits for the condition associated with the transitions which allow it to go to a next state to be satisfied.

The state "0" corresponds to the state of the state machine in the absence of significant movement of the forearm 8. Significant movement here denotes a move which provokes an acceleration of the forearm 8 such that the norm of the acceleration measured by the accelerometer 30 exceeds a predetermined threshold THR0. Typically, the threshold THR0 lies between 0 and 0.8 g (1 g=9.80 m/s$^2$). For example, the threshold THR0 is greater than 0.3 g or 0.5 g and less than 0.8 g.

Each time that the state machine arrives in the state "0", the module 24 executes the following operations:

resetting, to their default values, of the variables whose values are constructed by the module 24 as a function of the measurements of the accelerometer 30 and of the gyrometer 32, and therefore in particular, resetting to their default values of the values of the constructed characteristic physical quantities, and resetting, to their initial values, of the different time counters updated during the execution of the state machine.

Here, the default values of the variables, and in particular of the constructed characteristic physical quantities, are zero.

In this embodiment, the state machine uses time counters whose names are given in the table below.

| Time counter name | Initial value | Unit |
| --- | --- | --- |
| CAR0 | 50 ± 25 | Milliseconds |
| CAR1 | Lying between 500 and 1000 | |
| CAR2 | 50 ± 25 | |
| CAR3 | Less than 100 | |
| CAR4 | 50 ± 25 | |

In this table, for each time counter, a range of initial values is indicated. Preferably, the initial value of each counter is therefore chosen from the range indicated in the above table.

The state "1" corresponds to the state of the module 24 when a significant movement of the forearm 8 begins. The module 24 remains in this state as long as the forearm 8 does not decelerate significantly in the direction $X_m$.

In the state "1", each time new measurements are acquired by the module 24 at the current instant $t_c$, the module 24 executes the following operations:

computation of the norm $A_{tc}$ of the instantaneous acceleration of the forearm 8 from the most recent acquired measurements of the acceleration measured in the directions $X_m$, $Y_m$ and $Z_m$ by the accelerometer 30, only if the norm $A_{tc}$ of the instantaneous acceleration is below the threshold THR0, decrementation by $T_e$ of the counter CAR0, in which $T_e$ is the sampling period ($T_e=1/f_e$), independently of the computed norm $A_{tc}$ of the instantaneous acceleration, decrementation by $T_e$ of the counter CAR1, independently of the computed norm $A_{tc}$ of the instantaneous acceleration, determination whether the present instant corresponds to the instant $t_i$ at which the acceleration in the direction $X_m$ changes sign and, for example, becomes negative, and independently of the computed norm $A_{tc}$ of the instantaneous acceleration, construction of the characteristic physical quantities of the move currently performed by the boxer.

In this embodiment, the constructed characteristic physical quantities that are in the state "1" at each instant $t_c$ are as follows:

the minima $A_{minXm}$, $A_{minYm}$ and $A_{minZm}$ of the instantaneous accelerations measured, respectively, in the directions $X_m$, $Y_m$ and $Z_m$ during the time interval $[t_d; t_c]$, the maxima $A_{maxXm}$, $A_{maxYm}$ and $A_{maxZm}$ of the instantaneous accelerations measured, respectively, in the directions $X_m$, $Y_m$ and $Z_m$ during the time interval $[t_d; t_c]$, the average values $A_{moyXm}$, $A_{moyYm}$ and $A_{moyZm}$ of the instantaneous accelerations measured, respectively, in the directions $X_m$, $Y_m$ and $Z_m$ during the time interval $[t_d; t_c]$, the minima $V_{minXm}$, $V_{minYm}$ and $V_{minZm}$ of the instantaneous speeds of the forearm 8 in the directions, respectively, $X_m$, $Y_m$ and $Z_m$ during the time interval $[t_d; t_c]$, the maxima $V_{maxXm}$, $V_{maxYm}$ and $V_{maxZm}$ of the instantaneous speeds of the forearm 8 in the directions, respectively, $X_m$, $Y_m$ and $Z_m$ during the time interval $[t_d; t_c]$, the average values $V_{moyXm}$, $V_{moyYm}$ and $V_{moyZm}$ of the instantaneous speeds of the forearm 8 in the directions, respectively, $X_m$, $Y_m$ and $Z_m$ during the time interval $[t_d; t_c]$, the minima $G_{mimXm}$, $G_{minYm}$ and $G_{minZm}$ of the instantaneous angular speeds of the forearm 8 about the axes parallel to the directions, respectively, $X_m$, $Y_m$ and $Z_m$ during the time interval $[t_d; t_c]$, the maxima $G_{maxXm}$, $G_{maxYm}$ and $G_{maxZm}$ of the instantaneous angular speeds of the forearm 8 about the axes parallel to the directions, respectively, $X_m$, $Y_m$ and $Z_m$ during the time interval $[t_d; t_c]$, the average values $G_{moyXm}$, $G_{moyYm}$ and $G_{moyZm}$ of the instantaneous angular speeds of the forearm 8 about the axes parallel to the directions, respectively, $X_m$, $Y_m$ and $Z_m$ during the time interval $[t_d; t_c]$, the minima $D_{minXm}$, $D_{minYm}$ and $D_{minZm}$ of the instantaneous distances traveled by the forearm 8 in the directions, respectively, $X_m$, $Y_m$ and $Z_m$ during the time interval $[t_d; t_c]$, the maxima $D_{maxXm}$, $D_{maxYm}$ and $D_{maxZm}$ of the instantaneous distances traveled by the forearm 8 in the directions, respectively, $X_m$, $Y_m$ and $Z_m$ during the time interval $[t_d; t_c]$, and the average values $D_{moyXm}$, $D_{moyYm}$ and $D_{moyZm}$ of the instantaneous distances traveled by the forearm 8 in the directions, respectively, $X_m$, $Y_m$ and $Z_m$ during the time interval $[t_d; t_c]$.

The instant $t_d$ is equal to the first instant $t_c$ at which the module 24 is in the state "1" and therefore corresponds to the instant of the beginning of the move of the boxer.

Here, the module 24 determines, at each successive instant $t_c$:

the instantaneous speeds $V_{tcXm}$, $V_{tcYm}$ and $V_{tcZm}$ in the directions, respectively, $X_m$, $Y_m$ and $Z_m$, the norm $V_{tc}$ of the instantaneous speed from the instantaneous speeds $V_{tcXm}$, $V_{tcYm}$ and $V_{tcZm}$, the instantaneous distances traveled $D_{tcXm}$, $D_{tcYm}$ and $D_{tcZm}$ in the interval $[t_d; t_c]$ in the directions, respectively, $X_m$, $Y_m$ and $Z_m$, and the norm $A_{tc}$ of the instantaneous acceleration from the accelerations acquired in the directions $X_m$, $Y_m$ and $Z_m$.

For example, here, the module 24 determines the speeds $V_{tcXm}$, $V_{tcYm}$ and $V_{tcZm}$ by integration of the measurements of the accelerometer 30 in the directions $X_m$, $Y_m$ and $Z_m$. The instantaneous distance $D_{tcXm}$ is for example computed by adding to the instantaneous distance $D_{(tc-1)Xm}$ computed at the preceding instant $t_{c-1}$, the additional distance traveled between the instants $t_{c-1}$ and $t_c$. This additional distance is positive if the movement is in the direction $X_m$ and negative if the movement is in the opposite direction.

At each instant $t_c$, in the state "1", the module 24 searches for the instant $t_i$. For that, here, at each instant $t_c$, the module 24 checks whether this instant $t_c$ corresponds to the instant $t_i$, that is to say to an instant at which the acceleration $A_{tcXm}$ in the direction $X_m$ changes sign to become negative. For example, to do that, the module 24 checks whether the acquired acceleration $A_{tcXm}$ is negative and whether the acquired acceleration $A_{tc-1,Xm}$ at the preceding instant $t_{c-1}$ is positive. In the affirmative, this instant $t_c$ is then the instant $t_i$ at which the acceleration in the direction $X_m$ changes sign to become negative. At this instant $t_i$, the module 24 stores in the memory 12:

the instantaneous speeds $V_{tiXm}$, $V_{tiYm}$ and $V_{tiZm}$,
the norm $V_{ti}$ of the instantaneous speed at the instant $t_i$,
the norm $A_{ti}$ of the instantaneous acceleration at the instant $t_i$.

The module 24 also saves in the memory 12 the current values of the characteristic physical quantities constructed at this instant $t_i$. Thus, the characteristic physical quantities stored are only constructed from the measurements of the inertial unit 20 performed in the interval $[t_d; t_i]$.

Finally, in the state "1", the module 24 resets the counter CAR3 to its initial value if the condition associated with a transition $t_{16}$ is satisfied. The transition $t_{16}$ is described later in a table of the conditions which associates, with each transition of the state machine of FIG. 3, the corresponding condition.

The state "2" corresponds to the state of the state machine when approaching the end of the move of the boxer. The state "2" corresponds therefore to a phase of deceleration of the forearm 8.

In the state "2", the module 24:
computes the norm $A_{tc}$ of the instantaneous acceleration, only if the norm $A_{tc}$ is below the threshold THR0, it decrements by $T_e$ the counter CAR0, and
only if the condition associated with the transition $t_{24}$ is satisfied, it resets the counter CAR4 to its initial value (see below, the table of the conditions which associates with this transition $t_{24}$ a condition).

The states "3", "4", "6" and "7" are states used to confirm or deny that the current move of the boxer is a move to be recognized and not a stray move. In the case where the current move is indeed a move to be recognized, the state machine switches to the state "5". In the case where it is not possible to confirm that the current move is a move to be recognized:
either the state machine returns to the state "0" if it is established that the current move is a stray move,
or the state machine returns to the state "1" if it has not been possible, at this stage, either to confirm or deny that the current move is a move to be recognized.

The return to the state "1" makes it possible, if necessary, to subsequently confirm that the current move is indeed a move to be recognized.

When the state machine switches from the state "5" to the state "0", that means that the move to be recognized is finished. Upon its return to the state "0", the module 24 is capable of identifying the next move of the boxer.

In each of the states "3", "4", "5", "6" and "7", the module 24 performs the following operations:
it computes the norm $A_{tc}$ of the instantaneous acceleration, only if the norm $A_{tc}$ is below the threshold THR0 it decrements by $T_e$ the counter CAR0.

In addition, in the state "3", the module 24:
if the condition associated with the transition $t_{35}$ is satisfied, resets the counter CAR2 to its initial value and raises a flag here called "blow detected", and
if the condition associated with the transition $t_{31}$ is satisfied, resets the counter CAR1 to its initial value and reinitializes the search for the instant $t_i$ implemented in the state "1".

The reinitialization of the search for the instant $t_i$ consists in considering that the instant $t_i$ has not yet been reached and in relaunching the search for this instant $t_i$. Thus, when there is a return to the state "1", the construction of the characteristic physical quantities is resumed until the next instant $t_i$ found.

In the state "4", the module 24:
decrements, at each instant $t_c$, the counter CAR0 by $T_e$,
if the condition associated with the transition $t_{45}$ is satisfied, resets the counter CAR2 to its initial value and raises the "blow detected" flag,
if the condition associated with the transition $t_{41}$ is satisfied, resets the counter CAR1 to its initial value and reinitializes the search for the instant $t_i$.

In the state "5", the module 24 decrements, at each instant $t_c$, the counter CAR2 by $T_e$.

In the state "6", the module 24:
decrements, at each instant $t_c$, the counter CAR3 by $T_e$,
resets the counter CAR2 to its initial value and raises the "blow detected" flag if the condition associated with the transition $t_{65}$ is satisfied,
if the condition associated with the transition $t_{61}$ is satisfied, resets the counter CAR1 to its initial value and reinitializes the search for the instant $t_i$ implemented in the state "1".

In the state "7", the module 24:
if the condition associated with the transition $t_{75}$ is satisfied, resets the counter CAR2 to its initial value and raises the "blow detected" flag, and
if the condition associated with the transition $t_{71}$ is satisfied, resets the counter CAR1 to its initial value and reinitializes the search for the instant $t_i$ implemented in the state "1".

The conditions associated with the different transitions $t_{ij}$ of the state machine represented in FIG. 3 are described in the table below.

| Transition | Condition associated with the transition |
|---|---|
| $t_{01}$ | $A_{tc} >$ THR0 |
| $t_{10}$ | CAR1 = 0 OR CAR0 = 0 |
| $t_{12}$ | $A_{tcXm} <$ THR1 AND $V_{tiXm} > 0$ |
| $t_{16}$ | $A_{tcXm} <$ THR1 AND $V_{tiXm} \leq 0$ AND ($V_{tiYm}/V_{tc} > 0.7$ OR $V_{tiZm}/V_{tc} > 0.7$) |
| $t_{61}$ | CAR3 = 0 |
| $t_{20}$ | CAR0 = 0 |
| $t_{24}$ | $V_{tcXm} \leq 0$ |
| $t_{27}$ | $V_{tcXm} > 0$ AND ($V_{tiXm}/V_{ti} > 0.3$ OR $V_{tiYm}/V_{ti} > 0.7$) |
| $t_{23}$ | $V_{tcXm} > 0$ AND ($V_{tiXm}/V_{ti} \leq 0.3$ OR $V_{tiYm}/V_{ti} \leq 0.7$) |
| $t_{71}$ | ($A_{tcXm} > 0$) OR (($V_{tcXm} \leq 0$) AND ($A_{tcXm} \geq (1 - V_{tiXm}/V_{ti}) \times$ THR3)) |
| $t_{41}$ | CAR4 = 0 |
| $t_{30}$ | CAR0 = 0 |
| $t_{31}$ | $V_{tcXm} < 0$ AND $A_{tcXm} \geq$ THR3 |
| $t_{35}$ | $V_{tcXm} < 0$ AND $A_{tcXm} <$ THR3 |

-continued

| Transition | Condition associated with the transition |
|---|---|
| $t_{40}$ | CAR0 = 0 |
| $t_{45}$ | $A_{tcXm}$ < THR5 |
| $t_{70}$ | CAR0 = 0 |
| $t_{75}$ | ($V_{tcXm}$ > 0 AND $A_{tcXm}$ < THR4) OR ($V_{tcXm}$ ≤ 0 AND $A_{tcXm}$ < $(1 - V_{tiXm}/V_{ti})$ × THR3) |
| $t_{60}$ | CAR0 = 0 |
| $t_{65}$ | $A_{tcXm}$ < THR2 |
| $t_{50}$ | (Variance ($G_{tcXm}$) > THR6 AND Variance ($G_{tcZm}$) > THR6) OR CAR2 = 0 OR CAR0 = 0 |

In the above table:
the symbol "x" denotes the multiplication operation,
the symbol "Variance ( . . . )" denotes a function which computes the variance of the measurement, this variance being computed from the measurements performed during a sliding window during the interval [$t_d$; $t_c$].

The values of the different predefined thresholds appearing in the conditions are chosen in accordance with the indications given in the table below:

| Thresholds | Numeric values | Unit of the numeric values |
|---|---|---|
| THR0 | Lying between 0 and 0.8 | G (1 g = 9.81 m/s²) |
| THR1 | −2.5 ± 0.5 | |
| THR2 | Lower than −7 | |
| THR3 | −4 ± 1 | |
| THR4 | −5 ± 1 | |
| THR5 | −4 | |
| THR6 | Above 20 000 | Degree/second |

The transition $t_{12}$ corresponds to the detection of a first strong deceleration preceded by a forward movement of the forearm 8 during which the speed in the direction $X_m$ is definitely positive. This situation is encountered, for example, when the move which is executed by the boxer is one of those represented in FIGS. 7 to 10 and 13.

The transitions $t_{16}$ and $t_{65}$ correspond to the detection of a first strong deceleration and, in the case of the transition $t_{16}$, preceded by a move in which the speed in the direction $Y_m$ or $Z_m$ is predominant at the start of this deceleration. This situation is encountered for example when the move executed by the boxer is one of those represented in FIGS. 11 and 14. The case where the speeds $V_{tiYm}$ or $V_{tiZm}$ are negative correspond, for example, to the move of FIG. 15.

The state "2" is reached when, at the start of the deceleration, the speed $V_{tiXm}$ is positive. Consequently, cancellation of the speed $V_{tcXm}$ (transition $t_{24}$) indicates the complete stopping of the move. The state "4" then makes it possible to test whether the stopping of the move is abrupt and, if it is, to confirm that it is a move to be recognized (transition $t_{45}$).

Some boxers do not suddenly stop their move when they perform it without making contact, particularly when performing a hook. In this case, there is nevertheless an abrupt deceleration of the forearm 8 when the maximum extension of the arm is reached. The transition $t_{27}$ makes it possible to test whether this move is fairly rapid for it to be confirmed as being a move to be recognized.

The transitions $t_{31}$, $t_{35}$, $t_{71}$ and $t_{75}$ were designed experimentally to eliminate stray moves.

An abrupt variation of the angular speeds $G_{tcYm}$ and $G_{tcZm}$ occurs generally toward the end of the move of the boxer, that it to say for the maximum extension of the arm, particularly when the boxer strings together several consecutive moves. The transition $t_{50}$ detects the presence of this situation which marks the end of the move and allows the module 24 to return to the initial state "0". This way of proceeding by using the angular speeds has proven more reliable than the use of the measurements of the acceleration. In effect, toward the end of the move of the boxer, the device 2 vibrates such that the end of the move of the boxer is difficult to identify from just measurements of acceleration.

In addition, when the boxer strings the moves together, the norm $A_{tc}$ can remain above the threshold THR0 such that only the transition $t_{50}$ makes it possible to revert to the state "0" and correctly recognize several moves strung together one after the other.

The various counters make it possible to limit the duration of the step of confirmation of a move as being a move to be recognized. The initial values of the counters are in particular adjusted so as to prevent this step from being able to be extended over a fairly long time to cover two successive moves of the boxer.

The step of confirmation of the move of the boxer is, here, also limited by the duration of the counter CAR1 in order to limit the accumulation of measurement errors in the integrations implemented to compute the instantaneous speeds and distances.

Figure 4:
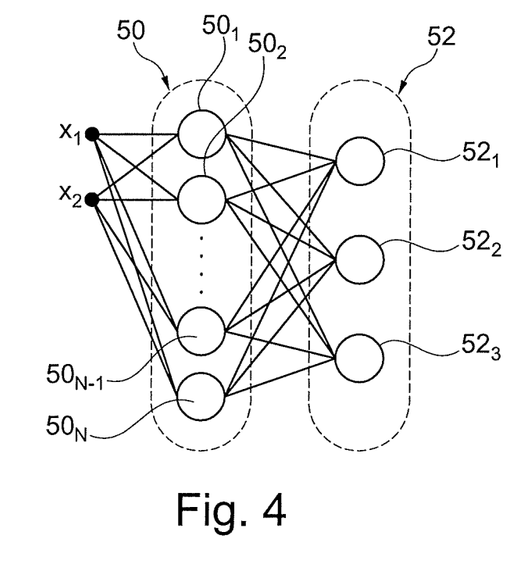
FIG. 4 is a schematic illustration of a neural network implemented in the device of FIG. 1.

There now follows a description of the operation of the classifier 26. FIG. 4 represents a neural network implemented by the classifier 26. It is a neural network of shallow depth, known as "shallow neural network". Here, the neural network comprises a single hidden layer 50 and a single output layer 52. The layer 50 comprises N hidden neurons. N here lies between eight and twelve. For example, N is equal to ten.

To simplify FIG. 4, only four neurons $50_1$, $50_2$, $50_{N-1}$ and $50_N$ of this layer 50 have been represented. Each neuron of the layer 50 receives all the characteristic physical quantities constructed by the module 24. Each neuron of the layer 50 computes a weighted sum $S_j$ according to the following relationship:

$$S_j = \sum_1^N w_{ij} x_i + b_j$$

in which:
the index i is an identifier of a constructed characteristic physical quantity,
$x_i$ is the value of the constructed physical quantity,
$w_{ij}$ a weight predetermined by learning,
$b_j$ is a bias predetermined by learning.

Then, the neuron generates a value $N_j$ on its output according to the following relationship $N_j=f(S_j)$, in which the function f is an activation function. Here, the activation function used for each neuron of the layer 50 is the hyperbolic tangent function or the sigmoid function.

To simplify the illustration and the description, here, the device 2 is described in the particular case where it is designed to recognize only the following three boxing moves:
a long straight punch of the forearm known as "jab",
a hook of the forearm known as "hook", and
an upward blow known as "uppercut".

However, from the teaching given in this application, the person skilled in the art knows how to adapt this neural network to recognize other additional moves.

The classifier 26 is designed to classify the characteristic physical quantities received in three predefined classes or categories, each corresponding to a respective move out of the three moves listed above.

For that, the layer 52 comprises only three neurons, 52$_1$, 52$_2$ and 52$_3$. Each of these three neurons corresponds to a respective predefined category of boxing moves. Each of the neurons 52$_1$ to 52$_3$ is connected to the output of each of the neurons of the layer 50.

In a way similar to what has been described for the neurons of the layer 50, each neuron 52$_1$ to 52$_3$ computes a weighted sum from the outputs $N_j$ of the neurons of the layer 50.

The activation function of the neurons 52$_1$ to 52$_3$ is, here, a function which identifies the neuron, out of the three neurons 52$_1$ to 52$_3$, which has computed the highest weighted sum and therefore the category in which the characteristic physical quantities processed are classified. The duly identified neuron corresponds to the recognized predefined move of the boxer.

The method for automatic recognition of a move of a boxer using the device 2 will now be described with reference to FIG. 5.

In a learning step 80, the weights $w_{ij}$ and the biases $b_j$ of each neuron of the neural network of the classifier 26 are determined. For that, the neural network is trained on a database containing sets of constructed characteristic physical quantities and, for each of these sets, the predefined category of boxing moves to which it belongs. Each set of characteristic physical quantities is constructed, preferably, by the module 24, upon the execution of the boxing move by a boxer or by several boxers. For example, the phase 80 is executed when the device 2 is being designed, then the values of the different weights and different biases are stored in the memory 12.

Then, in a recognition phase 90, the device 2 is used to automatically recognize the predefined moves. During this phase 90, the device 2 is fixed on the forearm 8. Initially, the state machine is in the state "0".

Then, in a measurement step 92, the inertial unit 20 permanently measures different physical quantities as a function of the movement of the forearm 8. In particular, in the step 92, the accelerometer 30 permanently measures the acceleration in the directions $X_m$, $Y_m$ and $Z_m$ and the gyrometer 32 permanently measures the angular speed about axes parallel to the directions $X_m$, $Y_m$ and $Z_m$.

In parallel, in an acquisition step 96, at each instant $t_c$, the microprocessor 10 acquires the measurements from the inertial unit 20. These measurements successively acquired at different instants form a temporal sequence of successive measurements of the acceleration and of the angular speed of the forearm 8.

Then, in an execution step 98, the module 24 executes, at each instant $t_c$, the state machine described previously. In each state, the module 24 checks whether a condition associated with one of the transitions is satisfied. For that, the module 24 uses the values of the variables, described with reference to FIG. 3, obtained from the measurements most recently acquired.

In addition, the module 24 executes the operations specifically associated with the current state of the state machine and described with reference to FIG. 3.

Thus, in the execution step 98, the module 24:
confirms and, alternatively denies, that the move currently performed by the boxer is a move to be recognized, that is to say that the move is other than a stray move and, in parallel, constructs characteristic physical quantities of this move from just the measurements performed in the interval $[t_d; t_i]$.

Here, the characteristic physical quantities are constructed in the state "1". The current move of the boxer is a move to be recognized by the classifier 26 if the state machine switches into one of the states "3", "4", "6" or "7" then through the state "5". In the contrary case, it is a stray move which is not intended to be recognized by the classifier 26. The state machine returns to the state "0" when the move to be recognized is finished or when it is a stray move.

In parallel, in step 110, the classifier 26 is executed. For example, the step 110 is triggered as soon as the "blow delivered" flag is raised by the module 24. In response, the characteristic physical quantities currently stored in the memory 12 are then processed using the neural network previously described. Following this processing, the characteristic physical quantities processed are automatically classified in one of the three predefined categories of boxing moves. At this stage, the boxing move is then considered as having been recognized.

Possibly, in a step 112, each time a boxing move is recognized, this information is automatically transmitted to the server 18 via the wireless link 16. The server 18 can then perform additional processing operations such as, for example, displaying this information on a screen, transmitting it to other devices, or the like.

FIG. 6 represents another method for automatic recognition of a move of a boxer that can be implemented instead of the method of FIG. 5 in the device 2. The method of FIG. 6 is identical to the method of FIG. 5, except that the recognition phase 90 is replaced by a phase 120. The phase 120 is identical to the phase 90 except that the execution step 98 is replaced by a step 122. The step 122 is identical to the step 98 except that the characteristic physical quantities are expressed in an inertial reference frame $R_i$ and not in the mobile reference frame $R_m$. For that, each acceleration measured in the reference frame $R_m$ is converted into an acceleration expressed in the inertial reference frame $R_i$. For example, to do this, the module 24 implements the following relationship:

$$A_{tcRi} = q^* \otimes A_{tcRm} \otimes q$$

in which:
$A_{tcRi}$ is the acceleration vector expressed in the reference frame $R_i$,
$A_{tcRm}$ is the acceleration vector expressed in the reference frame $R_m$,
q and q* are, respectively, the attitude quaternion and its conjugate, and
the symbol "$\otimes$" is the quaternion multiplication operator.

The value of the attitude quaternion q is typically delivered by the inertial unit 20 and acquired by the microprocessor 10.

Then, the state machine implemented is the same as that described with reference to FIG. 3 except that the accelerations $A_{tcXm}$, $A_{tcYm}$ and $A_{tcZm}$ are those expressed in the reference frame P.

Chapter II: Variants:
Chapter II.1: Variants of the Device:

The sensors can be arranged at any point on the forearm of the boxer to measure the acceleration and the angular speed of the fist. For example, in a variant, the sensors are incorporated in a boxing glove. In another variant, they are fixed onto the elbow of the boxer.

The sensors are not necessarily incorporated in one and the same housing. For example, the accelerometer and the gyrometer are housed in different housings mechanically independent of one another. In this case, the accelerometer and the gyrometer can be fixed at different locations on the forearm 8.

The means 6 for fixing the housing 4 onto the forearm of the boxer is not necessarily a bracelet. For example, this fixing means can also be a boxing glove. In the latter case, the housing 4 is for example incorporated in this boxing glove.

The components of the device 2 can be remote. For example, the module 24 and the classifier 26 can be implemented in the server 18. In this case, the measurements acquired by the microprocessor 10 are directly transmitted to the server 18 and it is the server 18 which executes the module 24 and the classifier 26 on the measurements received. In an intermediate variant, only the classifier 26 is remote in the server 18.

The inertial unit 20 can comprise additional sensors that are useful for characterizing the move of the boxer. For example, the inertial unit 20 can in addition comprise a tri-axial magnetometer. The measurements from this tri-axial magnetometer are then used to construct additional characteristic physical quantities that are different from those previously described. These additional physical quantities are then used by the classifier 26 to classify the move of the boxer in a predefined category. The inertial unit 20 can also comprise a velocimeter which directly measures the instantaneous speed of the forearm 8 in the directions $X_m$, $Y_m$ and $Z_m$. In this latter case, the instantaneous speeds are not computed by integration of the measured acceleration.

Chapter II.2: Variants of the module 24:

The search for the instant $t_i$ can be performed differently. For example, if the sign conventions for the acceleration are reversed, that is to say that the acceleration is negative when the fist accelerates in the direction $X_m$, then the instant $t_i$ corresponds to the instant at which the acceleration in the direction $X_m$ changes sign to become positive.

The module 24 can be produced differently. For example, the module 24 is not necessarily implemented in the form of a state machine. As an illustration, the module 24 can be produced as described in the document US20160263458. Thus, the module 24 determines an instant $t_f$ which corresponds to the end instant of the move to be recognized. For example, the instant $t_f$ is determined as described in the document US20140372440 or as described in the document US20160263458. If an instant $t_f$ has been able to be determined, this confirms the fact that the measurements performed in the interval $[t_d; t_f]$ do indeed correspond to a move of the boxer to be recognized.

The instant $t_d$ can be determined differently. For example, it can be determined as described in the document US20160263458, that is to say computed by subtracting a predetermined time $\Delta T$ from the determined instant $t_f$.

In the above variants, the instant $t_i$ is then identified in the interval $[t_d; t_f]$ by searching in this interval, for example, for the last instant $t_i$ at which the instantaneous acceleration in the direction $X_m$ changes sign to become negative. Note that, in this variant, the module 24 determines the instant $t_i$ only after it has confirmed that the current move of the boxer is indeed a move to be recognized.

As indicated above, the module 24 can construct other characteristic physical quantities that can be used by the classifier 26.

In another variant, the construction of the characteristic physical quantities is not performed by the module 24 but by another software module of the microprocessor 10. For example, this other software module is only executed after the module 24 has confirmed that the current move is indeed a move to be recognized. In this case, the construction of the characteristic physical quantities is not executed concurrently with the module 24 confirming that the current move is indeed a move to be recognized, but only after, and only in the case where it has been confirmed that the current move is indeed a move to be recognized.

State machines other than that described with reference to FIG. 3 are possible. For example, the state machine of FIG. 3 can be simplified by eliminating certain states such as the states "3" or "4" or "7". Conversely, additional states and additional transitions can be added in the state machine of FIG. 3.

Chapter II.3: Variants of the Classifier:

Here, the classifier has been described as being preferably produced in the form of a shallow neural network. However, as a variant, the classifier can be produced using a neural network comprising several hidden layers.

The classifier can also be produced by using a technology other than neural networks. For example, as a variant, the classifier is a support vector machine known by its acronym SVM, a naïve Bayes classifier, or the like. The classifier can also be produced as described in the document US20160263458.

The number of boxing moves that are sought to be recognized can be more or less than in the exemplary embodiment described previously. For example, in a simplified version, the device 2 and therefore the classifier 26 is designed to recognize a single predefined move of the boxer.

Conversely, the classifier 26 can also easily be adapted to recognize other additional moves in addition to or instead of the three particular moves previously described. To this end, the number of neurons of the layer 52 is adjusted accordingly. For example, an additional neuron is added to the layer 52 to recognize the move known as long straight punch of the rear arm, or "cross". Additional neurons can be also added to the layer 52, each of these neurons corresponding to one of the moves described with reference to FIGS. 7 to 14.

Chapter II.4: Other Variants:

What has been described here in the particular case of a right forearm is easily transposed to the case where the device 2 is fixed onto the left forearm of the boxer. However, in this case, for example, the signs of the measurements performed along or about the axis in the direction $Y_m$ are systematically reversed. Thanks to such a reversal, the conditions associated with the different transitions of the state machine of FIG. 3 do not need to be modified.

As a variant, the steps 98 and 110 are not executed in parallel with the measurement step 92, but after. Thus, in a particular embodiment, the measurements are acquired and stored in the memory 12 when the boxer is training. Then, for example, after the end of the training of the boxer, the steps 98 and 110 are executed to automatically recognize the moves that the boxer has performed in his training.

The device 2 can equally be used in the context of a boxing match, of training of a boxer but also in any other context, such as that of video games, in which one of the players simulates boxing moves.

More generally, the device 2 can be adapted to recognize predetermined moves other than boxing moves. For example, the teaching given here in the particular case of boxing moves can be adapted to recognize other predetermined moves, such as those performed in all contact sports. Illustrations of other contact sports that can be cited include all the combat sports and all the sports involving an impact with the fist or the forearm on an object or another player.

Thus, the device 2 can also be adapted to team sports such as rugby, American football or the like.

Chapter III: Advantages of the Embodiments Described:

The fact that the characteristic physical quantities used by the classifier are constructed only from the measurements performed in the interval $[t_d; t_i]$ means that the measurements performed just before or during the abrupt deceleration which occurs at the moment of the impact on the target or when the extension of the arm is maximal are disregarded for the classification. It has been observed that by disregarding these measurements which immediately precede the impact or the stopping of the move of the boxer, the reliability of the method for recognizing the move of the boxer is greatly improved. It is assumed that that stems from the fact that by proceeding in this way, the very strong variations of the acceleration and of the angular speed that are observed at the end of the move of the boxer are disregarded. In effect, it seems that the measurements performed by the accelerometer at the end of the move of the boxer are less reliable than those performed during the phase of acceleration of the forearm of the boxer.

The fact that the module 24 is reset for it to be capable of identifying a new move of the boxer from a condition on the angular speeds $G_{tcYm}$ and/or $G_{tcZm}$ makes it possible to reliably detect the end of a move of the boxer when the boxer strings together several moves immediately one after the other.

The fact that the characteristic physical quantities are constructed in an inertial reference frame rather than in the mobile reference frame $R_m$ increases the reliability of the recognition method.

Surprisingly, it has been determined that a neural network with a single hidden layer improves the reliability of the recognition process compared to the case where a neural network with several hidden layers would be used.

Proceeding with the construction of the characteristic physical quantities before the module 24 has confirmed that the current move of the boxer is a move to be recognized makes it possible to speed up the method for automatic recognition of this move.

The invention claimed is:

1. A method for automatic recognition of a predetermined move of a user, the method comprising:
   acquiring, at a predetermined sampling frequency, measurements of a tri-axial accelerometer and of a tri-axial gyrometer, each fixed onto a forearm of the user,
   determining characteristic physical quantities of the move of the user from the acquired measurements that correspond to times after an instant $t_d$ at a beginning of the move of the user, without taking into account the measurements acquired from the accelerometer and from the gyrometer before the instant $t_d$, and
   classifying the move of the user into a predefined move category, chosen from among at least three possible predefined move categories, based only on the determined characteristic physical quantities,
   wherein the determining step comprises determining the characteristic physical quantities from the acquired measurements corresponding only to a time interval $[t_d; t_i]$, where an instant $t_i$ is an instant, later than the instant $t_d$, at which a measured acceleration of a fist of the user in a direction $X_m$, changes sign and becomes negative, before an abrupt deceleration marking an end of the move of the user,
   the direction $X_m$ is a direction parallel to the forearm of the user, directed from an elbow of the user toward the fist of the user, and
   a negative acceleration in the direction $X_m$ corresponds to a slowing down of a speed of the list of the user in the direction $X_m$, such that the determined characteristic physical quantities are independent of the measurements from the accelerometer after the instant $t_i$, and independent of the measurements of the accelerometer during the abrupt deceleration marking the end of the move of the user.

2. The method as claimed in claim 1, further comprising automatically resetting determination of the characteristic physical quantities when one of the following conditions is met:
   a variation of an angular speed, about at least one of an axis parallel to the direction $X_m$ and an axis parallel to a direction orthogonal to the direction $X_m$, exceeds a predetermined threshold, and
   an elapsed time interval from the instant $t_d$ exceeds a predetermined time.

3. The method as claimed in claim 1, wherein, the determining step further comprises determining at least one characteristic physical quantity of the characteristic physical quantities from the measurements of the accelerometer, which are expressed in an inertial reference frame.

4. The method as claimed in claim 1, wherein the classifying step is performed by a neural network comprising a single hidden layer.

5. The method as claimed in claim 1, wherein:
   after execution of the determining step and before execution of the classifying step, the method further comprises confirming that the determined characteristic physical quantities correspond to a possible move of the user to be recognized, the confirming being made from the acquired measurements, and
   response to confirming that the determined characteristic physical quantities correspond to the possible move of the user to be recognized, triggering the classifying step and, in a contrary case, inhibiting triggering of the classifying step and resetting the determined characteristic physical quantities to default values.

6. The method as claimed in claim 5, wherein the confirming step is performed by a state machine.

7. The method as claimed in claim 1, wherein, the determining step further comprises determining the characteristic physical quantities including:
   a maximum, a minimum, and an average of instantaneous accelerations measured during the time interval $[t_d; t_i]$ in three mutually orthogonal directions,
   a maximum, a minimum, and an average of instantaneous speeds of the forearm during the time interval $[t_d; t_i]$ in three mutually orthogonal directions,
   a maximum, a minimum, and an average of instantaneous angular speeds measured during the time interval $[t_d; t_i]$ about three orthogonal axes of rotation, and
   a maximum, a minimum, and an average of instantaneous distances traveled, in three mutually orthogonal directions, during the time interval $[t_d; t_i]$.

8. The method as claimed in claim 1, wherein the predetermined move is a predetermined move of a boxer.

9. The method as claimed in claim 1, wherein, the determining step further comprises determining the characteristic physical quantities from the acquired measurements of the accelerometer and the gyrometer only within the time interval $[t_d; t_i]$.

10. A non-transitory microprocessor-readable information storage medium comprising instructions for executing a method according to claim 1, when said instructions are executed by the microprocessor.

11. The method of claim 1, further comprising determining the time instant $t_i$ at which the measured acceleration in the direction $X_m$ changes sign and becomes negative, based on the measured acceleration of the list of the user.

12. A device for automatic recognition of a predetermined move of a user, the device comprising:

a tri-axial accelerometer and a tri-axial gyrometer fixed on a forearm of a user, and processing circuitry configured to acquire, at a predetermined sampling frequency, the measurements of the tri-axial accelerometer and of the tri-axial gyrometer, when each is fixed onto the forearm of the user, determine characteristic physical quantities of the move of the user from the acquired measurements corresponding to times after an instant $t_d$ at a beginning of the move of the user, without taking into account the measurements acquired from the accelerometer and from the gyrometer before the instant $t_d$, and classify the move of the user into a predefined move category, chosen from among at least three possible predefined move categories based only on the determined characteristic physical quantities, wherein the processing circuitry is further configured to determine the characteristic physical quantities, from the acquired measurements corresponding only to a time interval $[t_d; t_i]$, where an instant $t_i$ is an instant, later than the instant $t_d$, at which a measured acceleration of a fist of the user in a direction $X_m$ changes sign and becomes negative, before an abrupt deceleration marking an end of the move of the user, the direction $X_m$ is a direction parallel to the forearm of the user, directed from an elbow of the user toward the fist of the user, and a negative acceleration in the direction $X_m$, corresponds to a slowing down of a speed of the fist of the user in the direction $X_m$, such that the determined characteristic physical quantities are independent of the measurements from the accelerometer after the instant $t_i$, and independent of the measurements of the accelerometer during the abrupt deceleration marking the end of the move of the user.

\* \* \* \* \*

UNITED STATES PATENT AND TRADEMARK OFFICE
CERTIFICATE OF CORRECTION

PATENT NO. : 11,167,170 B2
APPLICATION NO. : 16/413837
DATED : November 9, 2021
INVENTOR(S) : Boutet et al.

It is certified that error appears in the above-identified patent and that said Letters Patent is hereby corrected as shown below:

In the Claims

In Column 16, Claim 1, Line 2, delete "list" and insert -- fist --, therefore.

In Column 16, Claim 5, Line 34, insert -- in -- before "response".

In Column 16, Claim 7, Line 44, delete "quantities" and insert -- quantities, --, therefore.

In Column 17, Claim 11, Line 4, delete "list" and insert -- fist --, therefore.

In Column 18, Claim 12, Line 1, delete "categories" and insert -- categories, --, therefore.

In Column 18, Claim 12, Line 4, delete "quantities," and insert -- quantities --, therefore.

In Column 18, Claim 12, Line 15, delete "$X_m$," and insert -- $X_m$ --, therefore.

Signed and Sealed this
Tenth Day of May, 2022

Katherine Kelly Vidal
*Director of the United States Patent and Trademark Office*